United States Patent
Payne et al.

(10) Patent No.: US 6,212,215 B1
(45) Date of Patent: Apr. 3, 2001

(54) HYBRID SOLID STATE LASER SYSTEM USING A NEODYMIUM-BASED MASTER OSCILLATOR AND AN YTTERBIUM-BASED POWER AMPLIFIER

(75) Inventors: Stephen A. Payne, Castro Valley; Christopher D. Marshall; Howard T. Powell, both of Livermore; William F. Krupke, Pleasanton, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 08/409,244

(22) Filed: Mar. 24, 1995

(51) Int. Cl.⁷ ........................................................ H01S 3/14
(52) U.S. Cl. ..................................... 372/68; 372/41; 372/6
(58) Field of Search ................................... 372/6, 41, 29, 372/33, 68–71; 252/301.4 R; 359/338

(56) References Cited

U.S. PATENT DOCUMENTS

| | | | |
|---|---|---|---|
| 4,734,911 | 3/1988 | Bruesselbach | 372/29 |
| 4,757,268 | 7/1988 | Abrams et al. | 372/33 |
| 4,820,445 | * 4/1989 | Piekarczyk et al. | 252/301.4 R |
| 5,126,876 | 6/1992 | Omeara | 372/29 |
| 5,280,492 | * 1/1994 | Krupke et al. | 372/41 |
| 5,341,389 | * 8/1994 | Payne et al. | 372/41 |
| 5,369,655 | 11/1994 | Miyamoto et al. | 372/29 |
| 5,473,622 | 12/1995 | Grubb | 372/6 |

* cited by examiner

*Primary Examiner*—Leon Scott, Jr.
(74) *Attorney, Agent, or Firm*—Henry P. Sartorio; Alan H. Thompson

(57) ABSTRACT

In a master oscillator-power amplifier (MOPA) hybrid laser system, the master oscillator (MO) utilizes a $Nd^{3+}$-doped gain medium and the power amplifier (PA) utilizes a diode-pumped $Yb^{3+}$-doped material. The use of two different laser gain media in the hybrid MOPA system provides advantages that are otherwise not available. The Nd-doped gain medium preferably serves as the MO because such gain media offer the lowest threshold of operation and have already been engineered as practical systems. The Yb-doped gain medium preferably serves in the diode-pumped PA to store pump energy effectively and efficiently by virtue of the long emission lifetime, thereby reducing diode pump costs. One crucial constraint on the MO and PA gain media is that the Nd and Yb lasers must operate at nearly the same wavelength. The 1.047 $\mu$m Nd:YLF/Yb:S-FAP [Nd:LiYF$_4$/Yb:Sr$_5$(PO$_4$)$_3$F] hybrid MOPA system is a preferred embodiment of the hybrid Nd/Yb MOPA.

15 Claims, 4 Drawing Sheets

HYBRID SOLID STATE LASER SYSTEM USING A NEODYMIUM-BASED MASTER OSCILLATOR AND AN YTTERBIUM-BASED POWER AMPLIFIER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The invention relates generally to laser systems comprised of a master oscillator and a power amplifier. The invention relates particularly to the use of neodymium-doped crystals or glasses in the oscillator and to ytterbium-doped materials in the amplifier. The invention relates most specifically to laser systems operating at 1.047 $\mu$m, where Nd:LiYF$_4$ oscillators (Nd:YLF) are employed in conjunction with diode-pumped Yb:Sr$_5$(PO$_4$)$_3$F amplifiers (Yb:S-FAP).

2. Description of Related Art

One of the most common architectures employed for laser systems consists of the master oscillator (MO) and power amplifier (PA) or MOPA. Here, the roles of initially generating a laser light beam with certain characteristics, and then amplifying this light beam up to a particular power level, are separated in the laser system. This architecture allows the designer to independently optimize the generation and amplification processes.

The purpose of the master oscillator (MO) is most commonly to generate a light beam that meets certain specifications related, for example, to the wavelength, beam quality, spectral width, temporal format, and stability. The MO often includes additional optical components aside from the customary mirrors and gain element, such as a Q-switch, etalon, Bragg cell, and/or aperture. The extra optical components manipulate the light beam in order to impose the desired characteristics on it. The oscillator gain element is most suitably capable of having a low threshold of operation and of inducing minimal optical and thermal distortions to the laser beam. The main idea is that the MO is a low power or energy device, although it is precise in realizing certain beam parameters.

In contrast, the predominating concerns surrounding the power amplifier (PA) design commonly relate to cost and efficiency. In other words, the MO is envisioned to provide a relatively weak beam with certain precisely tailored properties, while it is the purpose of the PA to greatly increase its power and energy. The PA generally requires greater electrical input and utilizes larger optical gain elements than the MO.

The present invention relates mainly to amplifiers that are pumped by quasi-coherent sources (e.g. lasers, diodes, or laser diode technology), rather than flashlamps. As a consequence of the relatively large cost associated with laser diode pump sources per unit of light power, the use of gain media that can provide greater pumping efficiency will essentially serve to reduce the diode costs. In this way, the employment of superior gain media in the amplifier will optimize both the cost and efficiency of the amplifier. One key requirement of the MOPA is that the operating wavelength of the MO must fall within the useful gain bandwidth of the PA.

The MOPA architecture is usually implemented by utilizing the same gain medium throughout the laser. For example, most commercial Nd:YAG (neodymium-doped Y$_3$Al$_5$O$_{12}$) lasers utilize a flashlamp-pumped oscillator and amplifier. The oscillator is often arranged to operate mode-locked, Q-switched, or with a single longitudinal mode; the power amplifier is sometimes designed with a larger laser rod and/or additional flashlamps. Other common laser materials such as Nd:YLF, Ti:sapphire, and alexandrite are routinely deployed in systems using the standard MOPA architecture. The obvious advantage of this strategy is that the oscillator and amplifier are guaranteed to operate at the same wavelength.

An early example of a hybrid MOPA laser system (using dissimilar gain media) is the Nd:YAG oscillator used in conjunction with an amplifier based on Nd-doped silicate glass (Laser Program Annual Report—1979, UCRL-50021-79, available from National Technical Information Service, Springfield, Va). A special advantage of this combination is related to the capability of fabricating Nd:glass into large optical elements >100 cm$^3$ (to be compared to the modest size possible with Nd:YAG of ~10 cm$^3$). This aspect of Nd:glass permits the design of large, cost effective amplifiers. The Nd:YAG crystal, on the other hand, is especially amenable to oscillator design, due in part to its high thermal conductivity and large gain cross section. For these reasons, Nd:YAG oscillators offer both low laser threshold operation and straightforward means of thermal management. Although Nd:YAG does not absorb flashlamp light effectively, this issue is not considered crucial since the efficiency of the oscillator in a MOPA system is not central. Since the total energy associated with the MO is small compared to the PA, an inefficient MO does not appreciably impact the overall MOPA system efficiency. This example is illustrative of the concept that MOPA laser system performance can be optimized with different gain media (albeit the same Nd laser ion) in the oscillator and amplifier.

Another similar example is the hybrid MOPA system utilizing Nd:YLF and Nd-doped phosphate glass (C. Bibeau, D. R. Speck, R. B. Ehrlich et al., "Power, energy, and temporal performance of the Nova Laser facility with recent improvements to the amplifier system," Applied Optics 31, 5799–5809 (1992)). Both this example and the previous one entail using the same laser ion in the oscillator and amplifier (i.e., neodymium). In this way, the oscillator and amplifier are likely to have sufficient coincidental matches of the peak gain wavelength, since the Nd$^{3+}$ion typically lases within a relatively small range in most host materials (~1.04–1.09 $\mu$m).

A few hybrid MOPA systems employ materials based on different laser ions in the oscillator and amplifier. For example, Ti:sapphire oscillators can be used in conjunction with several types of amplifiers, since this laser material can operate between 0.66–1.1 $\mu$m (P. F. Moulton, "Spectroscopic and laser characteristics of Ti:Al$_2$O$_3$," Journal of Optical Society of America B 3 125–133 (1986)). Ti:sapphire lasers can also be self-modelocked to generate pulses of ~100 femtosecond duration. Flashlamp-pumped 0.83 $\mu$m Cr:LiSAF (T. Ditmire and M. D. Perry, "Terawatt Cr:LiSrAlF$_6$ laser system," Optics Letters 18, 426–428 (1993)) and 1.05 $\mu$m Nd:glass amplifiers can be configured to amplify these pulses to a much higher level. In either case, the amplifiers are a more efficient and cost-effective means of greatly amplifying the oscillator output compared to Ti:sapphire.

SUMMARY OF THE INVENTION

Accordingly, the object of the invention is to provide an improved MOPA laser system, wherein the oscillator is based on a neodymium-doped crystal or glass, and the amplifier is based on an ytterbium-doped crystal or glass. The invention is a new type of hybrid laser based on a Nd oscillator and an Yb amplifier. In the preferred embodiment the amplifier is pumped by laser diodes or some other narrowband light source. The neodymium MO must be capable of generating laser light corresponding to a wavelength of appreciable gain for the PA. The neodymium-based medium should possess a higher gain cross section than that of the ytterbium-doped medium in the PA, while the ytterbium-based PA will have a longer energy storage time. In this way, the neodymium oscillator will have a minimal laser threshold while the ytterbium amplifier can offer greater energy storage efficiency and costeffective use of laser diode pump sources.

It is a further object of this invention to provide a Nd:YLF oscillator operating in conjunction with a diode-pumped Yb:S-FAP amplifier (S-FAP=$Sr_5(PO_4)_3F$), so as to provide an improved MOPA laser system. Since Nd:YLF oscillators have already been engineered to a high level, the invention takes full advantage of this previous development while allowing for the exploitation of greatly improved PA modules based on Yb:S-FAP. Nd:YLF and Yb:S-FAP media exhibit their gain peaks at exactly the same wavelength of 1.0475 μm (in air).

DETAILED DESCRIPTION OF THE INVENTION

Figure 1:
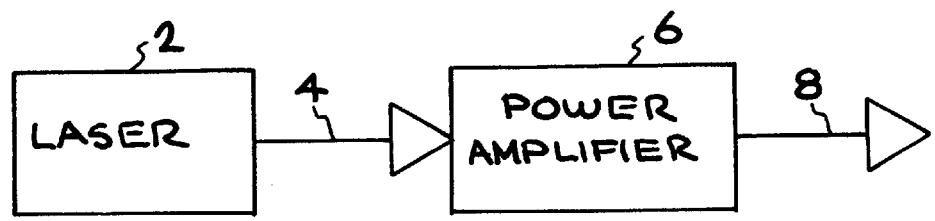
FIG. 1 is a generic drawing of a MOPA solid state laser system comprising a Nd-based master oscillator and an Yb-based power amplifier.

The invention is a solid state MOPA laser system comprising a Nd-doped crystal or glass serving as the gain medium in the master oscillator, and an Yb-doped crystal or glass for the power amplifier; FIG. 1 generally illustrates this configuration where the output beam (4) of the Nd-laser MO (2) is arranged so as to be injected into the Yb-power amplifier (6), so that the injected beam encounters gain to produce output beam (8). The main role of the MO is to generate a low power beam having precisely the desired spatial, temporal and spectral characteristics, while the purpose of the PA is to greatly increase the power of this beam through the stimulated emission process. The basis of this invention is the premise that the overall flexibility, cost and efficiency can be improved by the hybrid approach, wherein different gain media are used in the oscillator and amplifier.

Figure 2:
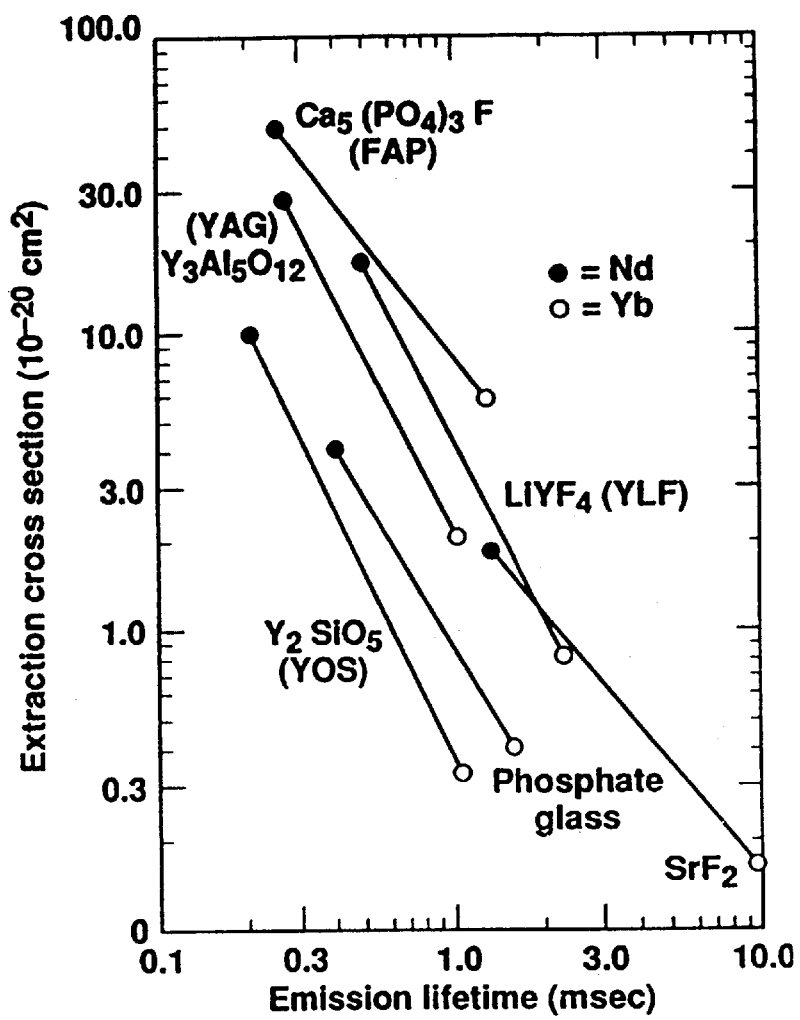
FIG. 2 presents comparisons between the emission cross section and lifetime characterizing various Nd- and Yb-doped crystals and glasses. The connecting lines denote the Yb and Nd data points associated with the same host material.

The benefits to be achieved from using a Nd master oscillator and an Yb power amplifier can be explained within the context of FIG. 2, (S. A. Payne, L. K. Smith, L. D. DeLoach, W. L. Kway, J. B. Tassano, and W. F. Krupke, "Laser, optical and thermomechanical properties of Yb-doped fluorapatite," IEEE Journal of Quantum Electronics 30, 170–179 (1994)). Here the emission cross sections and emission lifetimes of numerous Nd and Yb-doped materials are presented; a connecting line between the data points refers to a particular host. For the case of Yb and Nd in each host material, the Nd dopant offers a higher gain cross section and a shorter lifetime, while the Yb-doped material exhibits a ~4× longer emission lifetime along with a much lower gain cross section. As discussed below, these characteristic features render Nd-doped materials more useful in the MOs and Yb-doped materials better suited for use in the PAs. This is especially true for the situation where the PA is a diode-pumped device. For example, the Yb amplifier can accumulate ~4× more energy from the diode pump array than is the case for the Nd dopant in the same amplifier host medium. Accordingly, ~¼ as many of the expensive diode pump devices need to be purchased for the same available stored energy in the PA.

The threshold of a longitudinally-pumped continuous-wave oscillator is given by $$P_{th} = \frac{\pi \omega_p^2 \cdot L \cdot h\nu}{4(\sigma_g \tau_{em})} \tag{1}$$

where $\omega_p$ is the size of the pump beam, L is the cavity losses, hν is the photon energy, σg is the gain cross section, and $\tau_{em}$ is the emission lifetime. Nd-doped materials typically have a greater $\sigma g \tau_{em}$ product, and therefore exhibit lower laser thresholds, than Yb-doped materials. They also have high τg values, a feature that assists considerably in the design and operation of Q-switched oscillators. Furthermore, Nd-lasers operate as so-called four-level lasers, where the lower laser level is essentially unpopulated prior to the onset of laser action. Four-level laser operation is required for a gain medium to offer the lowest possible laser threshold. Finally, it is noteworthy that Nd-lasers have previously been engineered to a high level of precision, robustness, and are commercially available. To summarize, Nd-lasers are preferred for the oscillator due to the low laser threshold resulting from the high $\sigma g \tau_{em}$ product and the four-level operational scheme; the high efficiency of Q-switched operation arising from the large σg value; and the ready availability of previously engineered commercial oscillators.

In contrast, Yb-lasers may provide important advantages over Nd-lasers when considering the power amplifier. This is especially true for the situation where the gain medium is pumped by laser diodes or other costly narrowband pump sources (e.g., quasi-coherent diodes or other lasers). The main attribute of the Yb laser material is the possibility of enhanced pump utilization by these devices, since the longer emission lifetime (see FIG. 2) permits greater energy storage with less spontaneous emission loss. Second, the diminished gain cross section of Yb versus Nd reduces the extent of amplified spontaneous emission (ASE) losses. The ASE losses fundamentally arise from the amplification encountered by the spontaneous emission, resulting in the loss of the stored energy density. It is important to note that, while the lower gain cross section of Yb-doped materials reduces ASE to increase the pumping efficiency, the gain cross section must nevertheless be adequately large to assure efficient energy extraction (i.e., transferring the stored energy density to the laser beam). For nanosecond-type extraction pulses, the cross section should be no less than about $2\times10^{-20}$ cm$^2$.

Figure 3:
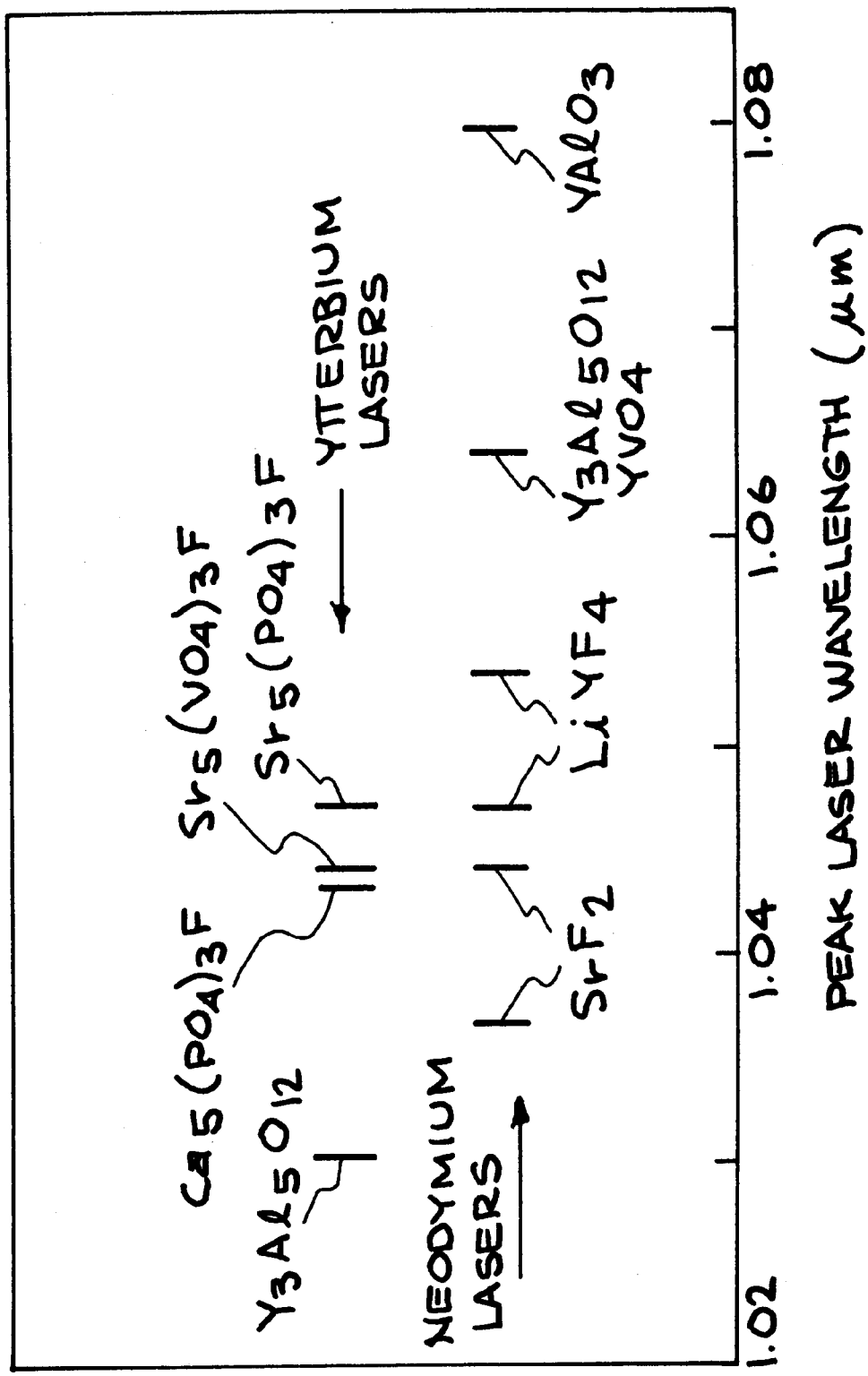
FIG. 3 shows the peak laser wavelengths of several representative neodymium and ytterbium-doped crystals. Although most known Yb-lasers tend to operate at wavelengths shorter than those of all known Nd-lasers, a region of wavelength overlap between Yb and Nd lasers does exist by virtue of the apatite material system.

One of the critical requirements for the hybrid Nd/Yb MOPA systems is that the oscillator and amplifier operate at essentially and preferably the same wavelength. While Nd-lasers can offer gain in the range of 1.036–1.09 μm and there are many cases of demonstrated laser action G. A. Caird and S. A. Payne, "Crystalline paramagnetic ion lasers," in Handbook of Laser Science and Technology, Supplement 1, ed. M. J. Weber (CRC Press, Boca Raton, 1991), Yb-lasers are relatively uncommon and, until recently, no crystals were known to operate with substantial gain in the range of >1.04 μm. The recent discovery of the Yb-doped apatite material system (see below) extends known Yb wavelengths to a range that overlaps Nd lasers. FIG. 3 illustrates the output wavelengths of numerous crystals doped with Nd and Yb. Several recent patents have included discussions of Yb-doped $Y_3Al_5O_{12}$ (U.S. Pat. No. 5,123,026, T. Y. Fan and P. Lacovara, Jun. 16, 1992) as well as $Ca_5(PO_4)_3F$ and related apatite crystals (U.S. Pat. No. 5,280,492, W. F. Krupke, S. A. Payne, L. L. Chase and L. K. Smith, Jan. 18, 1994; U.S. Pat. No. 5,341,389, S. A. Payne, W. L. Kway, L. D. DeLoach, W. F. Krupke, and B. H. T. Chai, (August 23, 1994)). It is noteworthy that Yb-doped silica fiber lasers have a broader output range and can therefore be more easily matched to the output of Nd-laser oscillators (D. C. Hanna, R. M. Percival, I. R. Perry, R. G. Smart, P. J. Suni, and A. C. Tropper, "An ytterbium-doped monomode fibre laser," Journal of Modern Optics 37 517–525 (1990)), although the gain cross section is extremely low. The data in FIG. 3 shows that the Nd:LiYF$_4$/Yb:Sr$_5$(PO$_4$)$_3$F hybrid system has a precise match in peak gain wavelength, although other combinations such as Nd:SrF$_2$/Yb:Sr$_5$(VO$_4$)$_3$F also have coincidental matches. Careful examination of the numerous demonstrated Nd-laser systems is likely to reveal additional coincidences. Those skilled in the art will understand the general principle described herein for selecting suitable combinations of Nd/Yb gain media for the MO/PA, respectively.

Yb-lasers are expected to exhibit inferior oscillator performance compared to Nd-lasers under most circumstances. This situation is a consequence of the relatively low gain cross sections characteristic of Yb-doped materials, and because the Yb ion operates as a quasi-three-level laser. As a result, Yb has natural ground state absorption loss at the laser wavelength and will therefore typically exhibit a higher threshold of oscillation than that of a comparable Nd-laser. The lower cross section and quasi-three-level structure diminish the flexibility and ease of designing Yb-laser oscillators.

Figure 4:
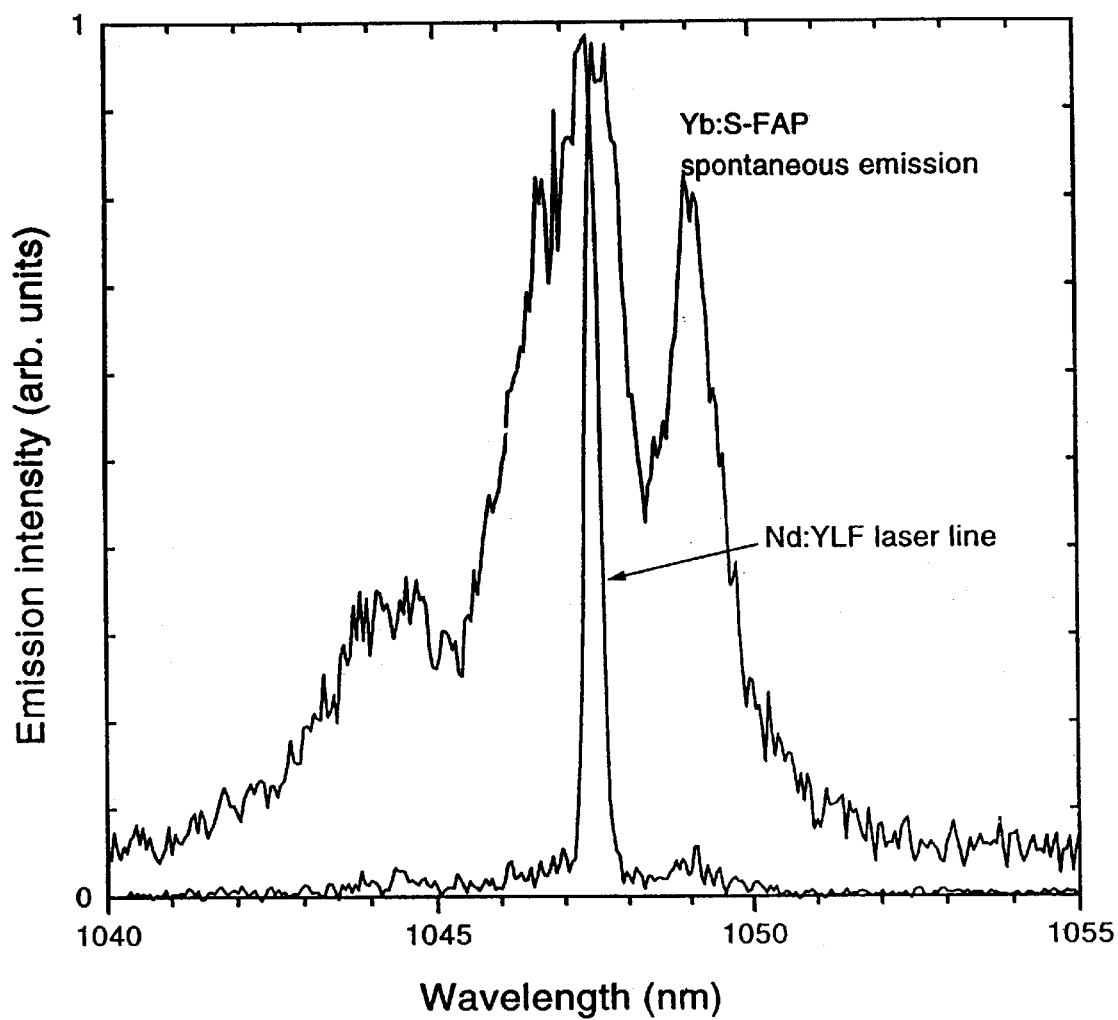
FIG. 4 shows that the peak gain wavelengths of Nd:YLF and Yb:S-FAP exactly coincide.

A preferred MOPA hybrid laser system that ideally embodies the concepts set forth in the present invention (although other comparable systems can be identified and developed), is the Nd:YLF/Yb:S-FAP [Nd:LiYF$_4$/Yb:Sr$_5$(PO$_4$)$_3$F] hybrid MOPA. The spectral overlap of a Nd:YLF oscillator output with the gain spectrum of Yb:S-FAP is pictured in FIG. 4, showing the remarkable overlap that is characteristic of this system. Yb:S-FAP has an emission storage time that is more than 2× greater than that of Nd:YLF (1.3 vs 0.5 msec). Furthermore, the gain cross section of Yb:S-FAP is $6\times10^{-20}$ cm$^2$ (compared to $20\times10^{-20}$ cm$^2$ for Nd:YLF). Yb:S-FAP can be conventionally pumped by InGaAs laser diodes at 0.90 μm, and its greater energy storage time and lower gain cross section both serve to increase the pumping effectiveness and efficiency of an Yb:S-FAP amplifier. Robust 1.047 μm Nd:YLF oscillators are commercially available at this time.

Figure 5:
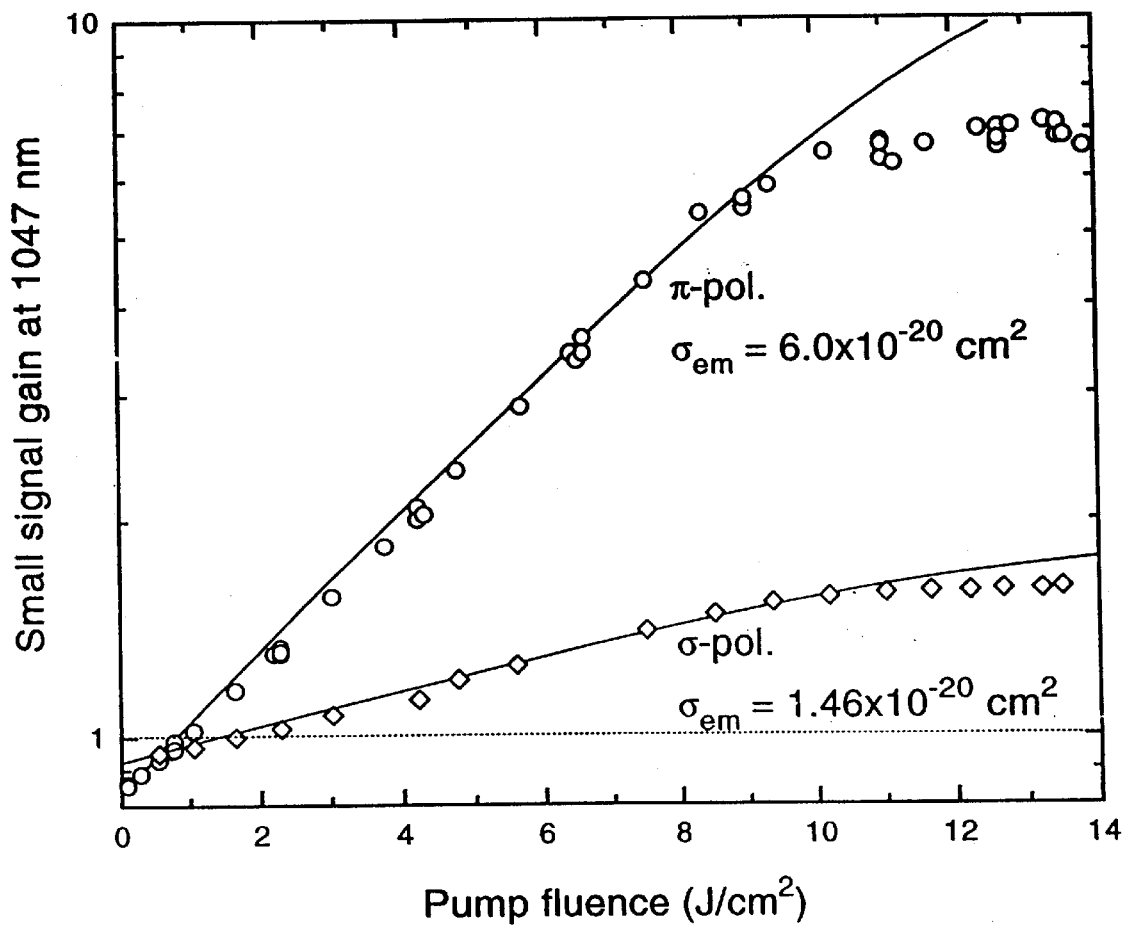
FIG. 5 contains a plot of the gain achieved for the output of a Nd:YLF master oscillator beam which is injected into and passed through an Yb:S-FAP power amplifier.

FIG. 5 demonstrates that a Nd:YLF MO can be effectively amplified by an Yb:S-FAP PA module, where single-pass gains as high as G=7 have been achieved. The observed amplification is consistent with the gain cross section noted on the figure and the stored energy density in the material. Greater output is achieved with π-polarized pump than with τ-polarized pump.

Thus the invention generally comprises a MOPA laser system formed of a laser master oscillator (MO) having a Nd-doped gain medium and a power amplifier (PA) having an Yb-doped gain medium. The Yb-doped gain medium is preferably pumped by laser diodes. The Yb-doped gain medium has an emission lifetime of >0.9 msec and an emission cross section of $<10\times10^{-20}$ cm$^2$; the Nd-doped gain medium has an emission lifetime of <0.7 msec and an emission cross section of $>10\times10^{-20}$ cm$^2$.

The Yb-doped gain medium is preferably a Yb-doped crystal having the formula $M_5(AO_4)_3X$, where M is a divalent cation selected from $Ca^{2+}$, $Sr^{2+}$, $Ba^{2+}$, $Cd^{2+}$ or $Pb^{2+}$ or a combination of monovalent and trivalent ions, selected from Li$^+$, Na$^+$, K$^+$, or Rb$^+$, and Y$^{3+}$, Lu$^{3+}$ or other RE$^{3+}$(rare earth); A is selected from Si, As, P, Ge, or V; and X is a singly-charged anion, selected from F$^-$, Cl$^-$, Br$^-$, I$^-$, or OH$^-$, or one-half the fraction of doubly-charged anions, selected from O$^{2-}$ or S$^{2-}$. Preferred Yb-doped crystals of this type include $Ca_5(PO_4)_3F$, $Sr_5(PO_4)_3F$, $(Ca,Sr)_5(PO_4)_3F$, or $Sr_5(VO_4)_3F$.

The Yb-doped crystal gain medium may also have the formula $A_3B_2C_3O_{12}$, where A is selected from Y$^{3+}$, La$^{3+}$, Gd$^{3+}$ Lu$^{3+}$ or other RE$^{3+}$(rare earth); B is selected from Sc$^{3+}$, Ga$^{3+}$, or Al$^{3+}$; and C is selected from Ga$^{3+}$ or Al$^{3+}$. Preferred Yb-doped crystals of this type include $Y_3Al_5O_{12}$, $Gd_3Ga_5O_{12}$, $Gd_3Sc_2Ga_3O_{12}$, $Y_3Sc_2Ga_3O_{12}$ or $Y_3Ga_5O_{12}$.

Changes and modifications in the specifically described embodiments can be carried out without departing from the scope of the invention which is intended to be limited only by the scope of the appended claims.

What is claimed is:

1. A MOPA laser system comprising:

a laser master oscillator (MO) pumped by a first pump source and having a Nd-doped gain medium for generating a MO beam with tailored beam properties; and a power amplifier (PA) pumped by a second pump source and having an Yb-doped gain medium for amplifying the MO beam, the MO and PA being arranged to input the MO beam into the PA to pass the MO beam through the Yb-doped gain medium;

the Nd-doped gain medium and Yb-doped gain medium having a gain maximum at substantially the same wavelength, the Nd-doped gain medium having a higher gain cross section than the Yb-doped gain medium, the Yb-doped gain medium having a longer energy storage time than the Nd-doped gain medium.

2. The MOPA laser system of claim 1 wherein said Yb-doped gain medium is pumped by laser diodes.

3. The MOPA laser system of claim 1 wherein:

the Yb-doped gain medium has an emission lifetime of >0.9 msec and an emission cross section of $<10\times10^{-20}$ cm$^2$;

the Nd-doped gain medium has an emission lifetime of <0.7 msec and an emission cross section of $>10\times10^{-20}$ cm$^2$.

4. The MOPA laser system of claim 3 wherein the Yb-doped gain medium is pumped by laser diodes.

5. The MOPA laser system of claim 1 wherein:
the Yb-doped gain medium is a Yb-doped crystal having the formula $M_5(AO_4)_3X$,
where
M is a divalent cation selected from $Ca^{2+}$, $Sr^{2+}$, $Ba^{2+}$, $Cd^{2+}$ or $Pb^{2+}$ or a combination of monovalent and trivalent ions, selected from $Li^+$, $Na^+$, $K^+$, or $Rb^+$, and $Y^{3+}$, $Lu^{3+}$ or other $RE^{3+}$ (rare earth),
A is selected from Si, As, P, Ge, or V,
X is a singly-charged anion, selected from $F^-$, $Cl^-$, $Br^-$, $I^-$, or $OH^-$, or one-half the fraction of doubly-charged anions, selected from $O^{2-}$ or $S^{2-}$.

6. The MOPA laser system of claim 5 wherein said Yb-doped crystal is pumped by laser diodes.

7. The MOPA laser system of claim 5 wherein the Yb-doped crystal is $Ca_5(PO_4)_3F$, $Sr_5(PO_4)_3F$, $(Ca,Sr)_5(PO_4)_3F$, or $Sr_5(VO_4)_3F$.

8. The MOPA laser system of claim 7 wherein the Yb-doped crystal is pumped by a laser diode.

9. The MOPA laser system of claim 1 wherein the Yb-doped gain medium is an Yb-doped fiber.

10. The MOPA laser system of claim 9 wherein said Yb-doped fiber is pumped by laser diodes.

11. A MOPA laser system, comprising:
a 1.047 μm master oscillator (MO) laser source having a Nd-doped $LiYF_4$ crystal gain medium for generating a MO beam; and
a 1.047 μm laser power amplifier (PA) having an Yb-doped $Sr_5(PO_4)_3F$ crystal gain medium for amplifying the MO beam, the MO and PA being arranged to input the MO beam into the PA to pass the MO beam through the Yb-doped crystal gain medium.

12. The MOPA laser system of claim 11 wherein said Yb-doped crystal gain medium is pumped by laser diodes.

13. A MOPA laser system, comprising:
a master oscillator (MO) laser source having a Nd-doped gain medium for generating a MO beam;
a laser power amplifier (PA) having an Yb-doped crystal gain medium having the formula $A_3B_2C_3O_{12}$ for amplifying the MO beam,
where
A is selected from $Y^{3+}$, $La^{3+}$, $Gd^{3+}$ $Lu^{3+}$ or other $RE^{3+}$ (rare earth),
B is selected from $Sc^{3+}$, $Ga^{3+}$, or $Al^{3+}$, and
C is selected from $Ga^{3+}$ or $Al^{3+}$,
the MO and PA being arranged to input the MO beam into the PA to pass the MO beam through the Yb-doped gain medium;
the Nd-doped gain medium and Yb-doped gain medium having a gain maximum at substantially the same wavelength the Nd-doped gain medium having a higher gain cross section than the Yb-doped gain medium, the Yb-doped gain medium having a longer energy storage time than the Nd-doped gain medium.

14. The MOPA laser system of claim 13 wherein said Yb-doped crystal is pumped by laser diodes.

15. The MOPA laser system of claim 14 wherein:
the laser diode-pumped Yb-doped gain medium is selected from a Yb-doped $Y_3Al_5O_{12}$, $Gd_3Ga_5O_{12}$, $Gd_3Sc_2Ga_3O_{12}$, $Y_3Sc_2Ga_3O_{12}$ or $Y_3Ga_5O_{12}$ crystal.

* * * * *